(No Model.)

G. CARLISLE.
UNIVERSAL JOINT.

No. 285,966. Patented Oct. 2, 1883.

WITNESSES:

INVENTOR:
G. Carlisle
BY Munn & Co
ATTORNEYS.

UNITED STATES PATENT OFFICE.

GEORGE CARLISLE, OF ATTLEBOROUGH, MASSACHUSETTS.

UNIVERSAL JOINT.

SPECIFICATION forming part of Letters Patent No. 285,966, dated October 2, 1883.

Application filed May 16, 1883. (No model.)

*To all whom it may concern:*

Be it known that I, GEORGE CARLISLE, of Attleborough, in the county of Bristol and State of Massachusetts, have invented certain new and useful Improvements in Universal Joints for Connecting Rotating Shafts, of which the following is a full, clear, and exact description.

The object of my invention is to provide a new and improved joint for coupling rotary shafts at an angle to each other in such a manner that the motion of one shaft can be readily and easily transmitted to the other shaft without any loss of motion or power, and without any undue strain on the parts.

The invention consists in a shaft-coupling formed of a ring passed through loops or staples formed on the ends of the shafts, each of which loops or staples is provided at the middle of its outer curved part with a projection having a conical end, the conical surfaces of the two shafts being in contact with each other.

Reference is to be had to the accompanying drawings, forming part of this specification, in which similar letters of reference indicate corresponding parts in both the figures.

Figure 1:
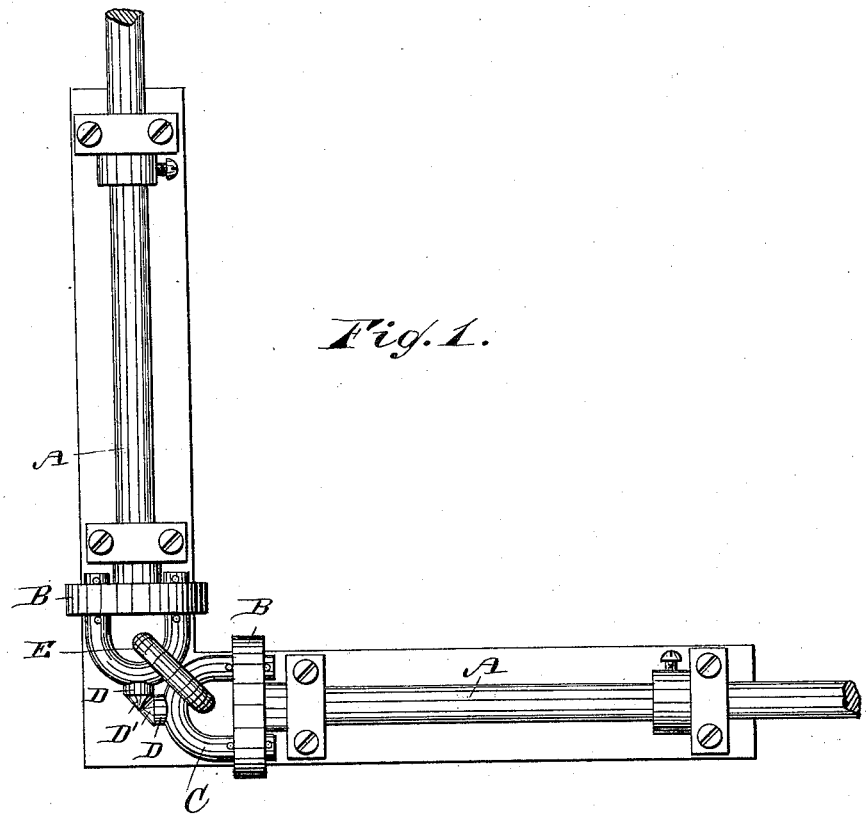
Figure 2:
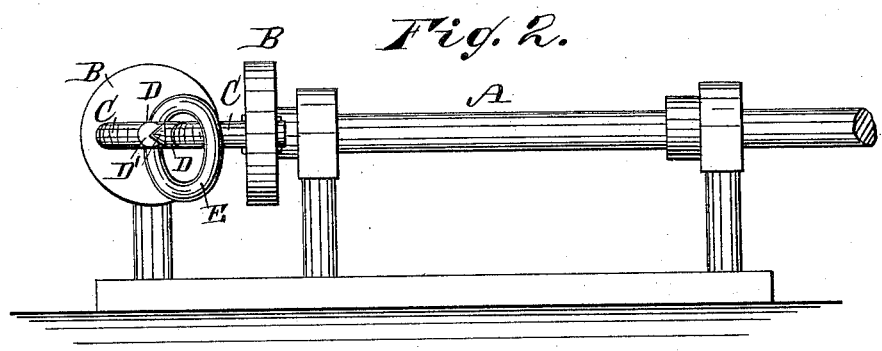

Figure 1 is a plan view of two shafts at right angles to each other, coupled by means of my improved universal joint. Fig. 2 is a longitudinal elevation of the same.

The shafts A, journaled in the usual manner, are at right angles to each other, and, at the adjoining ends, each shaft is provided with a rigidly-mounted disk or plate, B, which is provided with two apertures for receiving the ends of a U-shaped loop or staple, C, which is locked on the said disk by means of pins, or in any other suitable manner, so that the said staples project from the outer surface of the disk. The U-shaped loops or staples C are each provided on the middle of the outer side of the curved cross-piece with a projection, D, the end D' of which is made conical, and the shafts A must be so located that the conical ends of the two projections D will be in contact with each other, as shown. A ring, E, is passed through the two loops or staples C. If the shafts A are at right angles to each other, the bevels of the cones D' must be at an angle of forty-five degrees. If the angle of the shafts is obtuse, the inclination of the cones will have to be less than forty-five degrees, and if the angle of the shafts is acute the inclination of the cone will have to be greater than forty-five degrees. If one shaft is rotated, the movement will be transmitted through the ring E to the other shaft, the ring E revolving on a horizontal diameter which forms a diagonal line about parallel with the plan view, as shown in Fig. 1—that is to say, the upper part of the ring revolves downward and outward, and the lower part of the ring naturally revolves upward and inward. The outer shank of the staple on the driving-shaft presses the ring downward and the inner shank raises it, and the ring raises the inner shank of the staple on the driven shaft and presses the outer shank downward. The motion is very regular and easy, without any undue jar or strain, the parts do not rattle, and there is no loss of motion except in reversal.

If desired, the above joint may also be used for coupling straight shafting, the ends of the projections D abutting against each other. The projections D having the conical ends serve to center the adjoining ends of the shafts, for the ring E would press the staples so close together that the shafts could not be revolved. The said projections having the conical ends prevent the joint from rattling. The longitudinal axes of the projections D must coincide with the longitudinal axes of the corresponding shafts.

Having thus described my invention, I claim as new and desire to secure by Letters Patent—

1. A shaft-coupling made substantially as herein shown and described, and consisting of a ring passed through loops or staples on the ends of the shafts to be coupled, as set forth.

2. The combination, with two shafts at an angle to each other, of the loops or staples provided on the ends of the shafts, and of a ring passed through the said staples, substantially as herein shown and described, and for the purpose set forth.

3. The combination, with two shafts at an angle to each other, of loops or staples provided on the ends of the shafts, projections having conical ends formed on the middle of each loop or staple, the said conical surfaces being in contact, and of a ring passed through the two loops or staples, substantially as herein shown and described, and for the purpose set forth.

4. The combination, with shafts A, at an angle to each other, of the disks B on the ends of the shafts, the staples C, secured on the disks B, the ring E, passed through the staples, and the projection D, formed at the middle of each staple, and provided with a conical head, D', substantially as herein shown and described, and for the purpose set forth.

GEORGE CARLISLE.

Witnesses:
OSCAR F. GUNZ,
C. SEDGWICK.